US010033196B2

(12) United States Patent
Kim et al.

(10) Patent No.: US 10,033,196 B2
(45) Date of Patent: Jul. 24, 2018

(54) CONVERTING ALTERNATING CURRENT POWER TO DIRECT CURRENT POWER

(71) Applicant: Google Inc., Mountain View, CA (US)

(72) Inventors: Sangsun Kim, San Jose, CA (US); Francisco Javier Elias, Santa Clara, CA (US); Cornelius Bendict O'Sullivan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 340 days.

(21) Appl. No.: 14/856,748

(22) Filed: Sep. 17, 2015

(65) Prior Publication Data
US 2017/0047744 A1    Feb. 16, 2017

Related U.S. Application Data
(60) Provisional application No. 62/203,154, filed on Aug. 10, 2015.

(51) Int. Cl.
H02J 5/00    (2016.01)
H02M 1/36    (2007.01)
(Continued)

(52) U.S. Cl.
CPC ............... H02J 5/00 (2013.01); H02M 1/36 (2013.01); H02M 1/42 (2013.01); H02M 1/4216 (2013.01);
(Continued)

(58) Field of Classification Search
CPC ........................................................ H02J 5/00
(Continued)

(56) References Cited

U.S. PATENT DOCUMENTS 2,485,450 A    10/1949    Kotterman
4,356,541 A    10/1982    Ikenoue et al.
(Continued)

FOREIGN PATENT DOCUMENTS

EP            2755310 A1    7/2014
WO    WO-2011/137583 A1    11/2011

OTHER PUBLICATIONS

Kim, Sangsun et al., Three-Phase Active Harmonic Rectifier (AHR) to Improve Utility Input Current THD in Telecommunication Power Distribution System, IEEE Transactions on Indus. Apps. vol. 39, No. 5 (Sep./Oct. 2003), pp. 1414-1421.
(Continued)

*Primary Examiner* — Joseph Chang
(74) *Attorney, Agent, or Firm* — Honigman Miller Schwartz and Cohn LLP

(57) ABSTRACT

A method for converting alternating current (AC) power to direct current (DC) power in a non-isolated power converter includes receiving a three-phase power supply, transforming the three phase power supply into six voltage phases, half-wave rectifying the AC current, applying a power factor correction to achieve DC power, and outputting a DC power signal. The three-phase power supply has an AC current. The six voltage phase is transformed at a secondary side of a three-phase distribution transformer, which includes a center tap located at the secondary side of the three-phase distribution transformer and one or more AC wire conductors. The AC wire conductors carry the transformed power supply. The half-wave rectification occurs at the secondary side of the three-phase distribution transformer. An arrangement of rectifier diodes on the AC wire conductors accomplishes the half-wave rectification. The output DC power signal has an output voltage at a DC output.

15 Claims, 14 Drawing Sheets

(51) Int. Cl.
  *H02M 1/42* (2007.01)
  *H02M 3/158* (2006.01)
  *H02M 7/217* (2006.01)

(52) U.S. Cl.
  CPC ....... *H02M 1/4225* (2013.01); *H02M 3/1584* (2013.01); *H02M 7/217* (2013.01); *H02M 2003/1586* (2013.01); *Y02B 70/126* (2013.01)

(58) Field of Classification Search
  USPC ......................................................... 307/31
  See application file for complete search history.

(56) References Cited

U.S. PATENT DOCUMENTS

| | | | |
|---|---|---|---|
| 4,683,529 A * | 7/1987 | Bucher, II | H02M 1/4225 323/207 |
| 5,191,520 A | 3/1993 | Eckersley | |
| 5,430,639 A | 7/1995 | Takahashi | |
| 8,270,188 B1 | 9/2012 | Kim | |
| 8,624,433 B2 | 1/2014 | Whitted et al. | |
| 8,687,388 B2 | 4/2014 | Jang et al. | |
| 2013/0257301 A1 | 10/2013 | Tran et al. | |
| 2015/0016159 A1 | 1/2015 | Deboy | |
| 2015/0070940 A1 * | 3/2015 | Sato | H02M 3/1584 363/17 |
| 2015/0124487 A1 | 5/2015 | Fu et al. | |

OTHER PUBLICATIONS

Kim, Sangsun et al., *Control of Multiple Single-Phase PFC Modules with a Single Low-Cost DSP*, , IEEE Transactions on Indus. Apps. vol. 39, No. 5 (Sep./Oct. 2003), pp. 1379-1385.
Evaluation of 400V DC distribution in telco and data centers to improve energy efficiency, Pratt A et al. Telecommunications Energy Conference, 2007. Sep. 30, 2007, NJ pp. 32-39.
Researchgate.net/profile/Nikos_Hatziargyriou/publication/ 237305036. Retrived from internet Jan. 1, 2005; p. 2, paragraph 2.1; figure1.
European Extended Search Report for Application No. 16183536.8 dated Dec. 14, 2016.

* cited by examiner

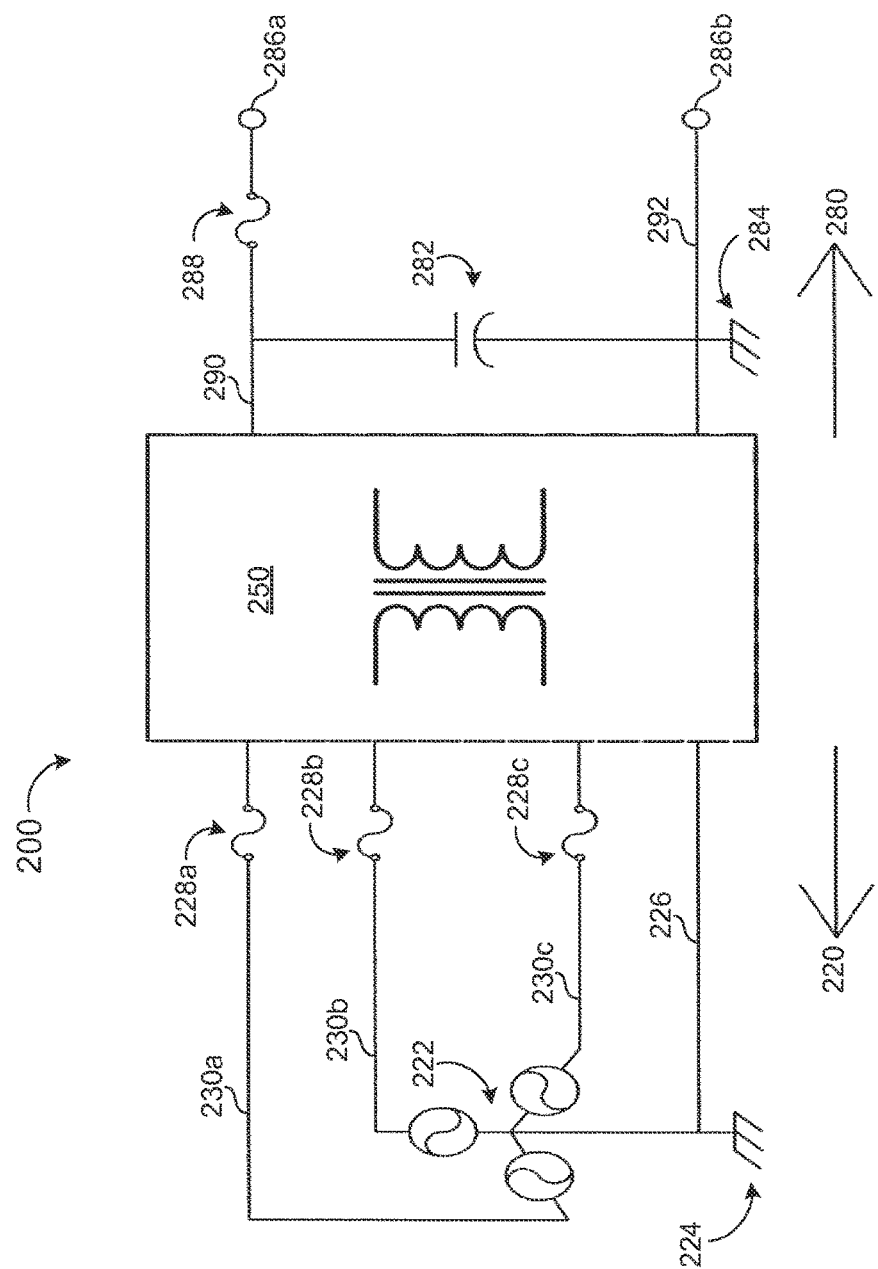

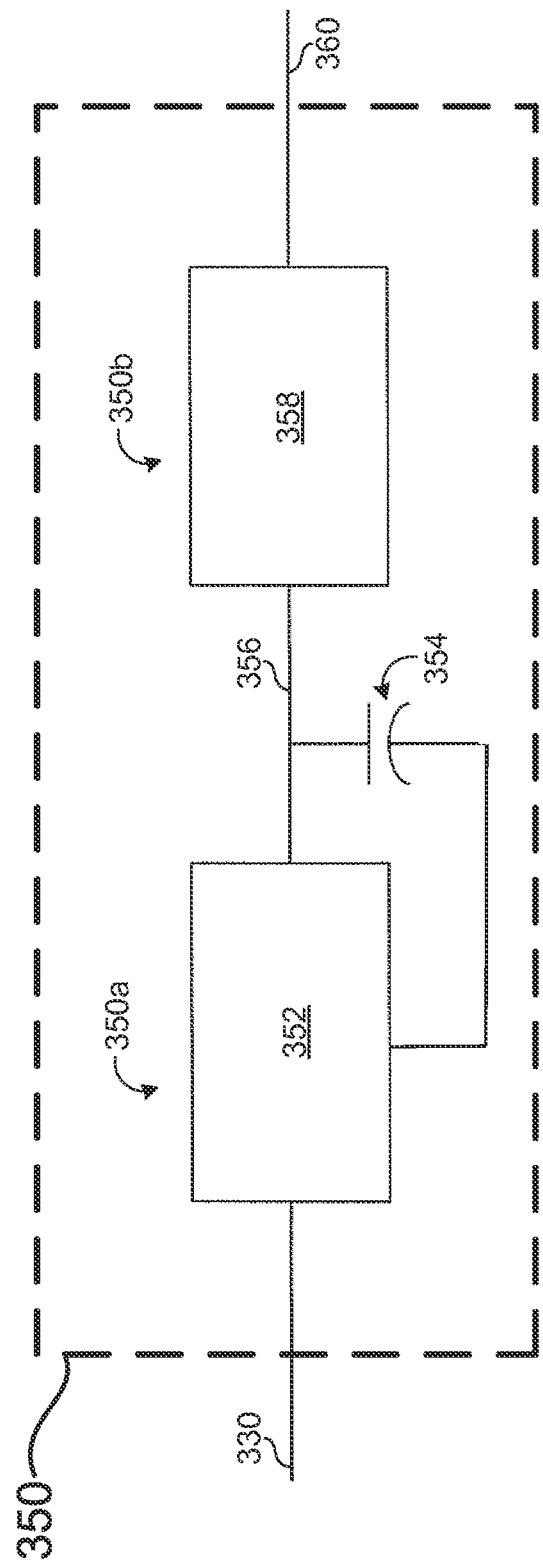

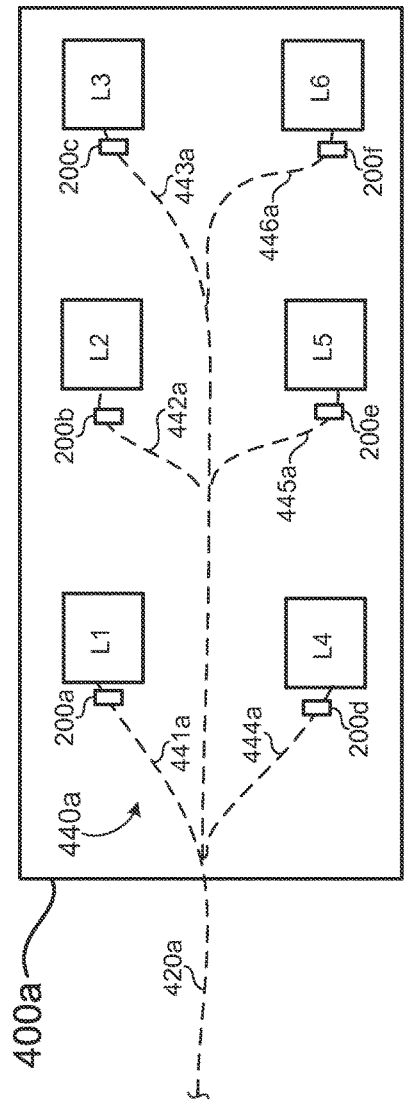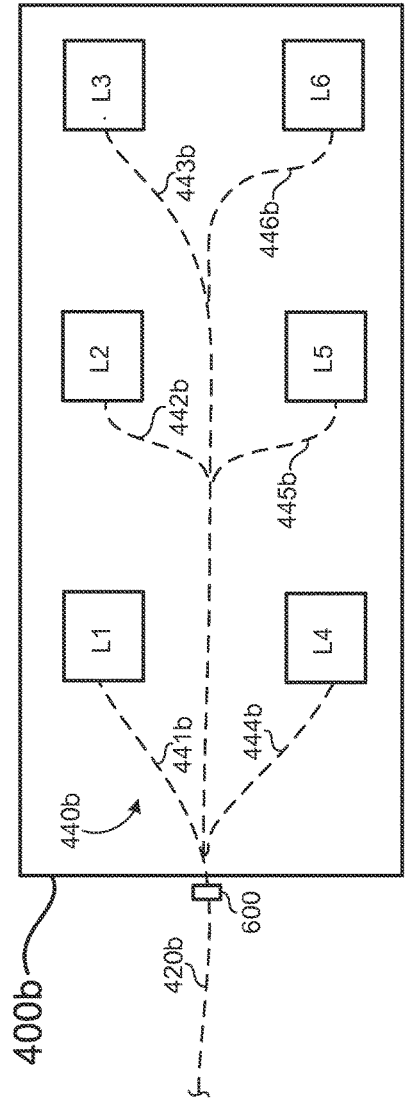

CONVERTING ALTERNATING CURRENT POWER TO DIRECT CURRENT POWER

RELATED APPLICATION

This U.S. patent application claims priority under 35 U.S.C. § 119(e) to U.S. Provisional Application No. 62/203,154, filed on Aug. 10, 2015, which is hereby incorporated by reference in its entirety.

TECHNICAL FIELD

This disclosure relates to efficient conversion from alternating current (AC) power to direct current (DC) power.

BACKGROUND

Typically, electric utilities distribute an alternating current (AC) electric power supply. To avoid converting AC power to direct current (DC) power, many residential electrical loads—for example, most house appliances and tools—operate on AC power. However, appliances and other electrical loads operating on DC power are slowly gaining popularity for two reasons. First, appliances and other loads operating on DC power provide for better efficiency that can result in substantial cost savings. Second, alternative power supply sources such as batteries, solar panels, and other renewable energy systems provide DC electric power. Improvements in the field of AC to DC power conversion are necessary to efficiently utilize utility-supplied AC power for the operation of appliances and other electrical loads requiring DC power.

Some facilities already house electrical loads requiring DC power. Data centers, which house server/computer racks and other computer system devices and accessories for electronic storage and telecommunications, are one example of facilities having loads that operate primarily on DC power. The IT system components housed at data centers operate primarily on DC power. Energy consumption represents the most significant operating cost of data centers, and power consumption efficiency is an important factor in the design of data centers. Accordingly, efficient AC to DC power conversion and power distribution systems (such as DC power distribution) are emerging options to achieve power consumption reductions at data centers.

SUMMARY

One aspect of the disclosure provides a method for converting alternating current (AC) power to direct current (DC) power in a non-isolated power converter. The method includes receiving a three-phase power supply and transforming the three phase power supply into six voltage phases. The method also includes half-wave rectifying the AC current, applying a power factor correction to achieve DC power, and outputting a DC power signal. The three-phase power supply has an AC current that is a full-wave sinusoidal AC current. The six voltage phase is transformed at a secondary side of a three-phase distribution transformer, which includes a center tap and one or more AC wire conductors. The center tap is located at the secondary side of the three-phase distribution transformer. The AC wire conductors carry the transformed power supply. The half-wave rectification occurs at the secondary side of the three-phase distribution transformer. An arrangement of rectifier diodes on the AC wire conductors accomplishes the half-wave rectification. The output DC power signal has an output voltage at a DC output.

Implementations of the disclosure may include one or more of the following optional features. In some implementations, the method includes powering one or more DC loads with the output voltage. In some examples, the output voltage is measured across one or more capacitor, and the method further includes operating one or more Q1 inrush and shutdown field-effect transistors. The one or more Q1 field-effect transistors limit a current flow and charge the one or more capacitors. In some implementations, the method further includes operating one or more Q2 ORing field-effect transistors. The one or more Q2 ORing field-effect transistors turn off for fault isolation upon sensing a negative current flow from the DC output.

In some implementations, the method includes providing an AC-rated device for AC protection on the one or more AC wire conductors. The DC output may include a positive DC output and a DC output ground, and the AC power at the secondary side of the three-phase distribution transformer may be in non-isolated communication with the DC output ground through a neutral wire conductor. In some examples, the AC power at the secondary side of the three-phase distribution transformer is grounded through a connection from the neutral wire conductor to a safety ground, the DC output ground is grounded through the connection from the neutral wire conductor to the safety ground, and the safety ground is a solid, low-, or high-impedance grounding.

Another aspect of the disclosure provides a power converter for converting alternating current (AC) power to direct current (DC) power. The power converter includes a three-phase distribution transformer for three-phase alternating current, a non-isolating three-phase rectifier having a positive DC output and a DC output ground, a bulk electrolytic capacitor, and a direct connection between the DC output ground and the transformer neutral. The three-phase distribution transformer for three-phase alternating current has a primary side and a secondary side. The secondary side of the three-phase distribution transformer has a center tap that forms a transformer neutral. The non-isolating three-phase rectifier is in communication with the three-phase distribution transformer. The bulk electrolytic capacitor connects the positive DC output and the DC output ground.

Implementations of this aspect of the disclosure may include one or more of the following optional features. In some implementations, the non-isolating three-phase rectifier includes a rectifier diode on each incoming AC phase and at least one boost converter corresponding to each of the incoming AC phases. The center tap at the secondary side may provide a six-phase AC voltage, the current at the primary side may be a full-wave sinusoidal AC current, and the AC currents at the secondary side may be half-wave rectified. In some examples, the direct connection between the DC output ground and the transformer neutral is safety grounded at a solid, a low-, or a high-impedance grounding.

Yet another aspect of the disclosure provides a three-phase distribution transformer that includes a three-phase input winding and a secondary winding in communication with the three-phase input winding. The three-phase input winding is arranged to receive alternating current (AC) power. The secondary winding includes six output conductors, a rectifying diode on each output conductor, and a center tap. Each of the rectifying diodes is arranged for half-wave rectification of the AC current at the secondary winding. The center tap is configured to output six-phase AC voltage along the six output conductors. The center tap also provides a transformer neutral directly connected to a DC output ground.

Implementations of this aspect of the disclosure may include one or more of the following optional features. In some implementations, the three-phase distribution transformer further includes a non-isolated, three-phase rectifier connected to the six output conductors that balances the AC current input on the three-phase input winding. In some examples, the six output conductors deliver AC power to a plurality of parallel rectifier systems.

Yet another aspect of the disclosure provides a non-isolated, three-phase rectifier including an input, a single-stage power factor without galvanized isolation, and output conductors. The input accepts a six-phase AC voltage input having a half-wave rectified current. The single-stage power factor correction without galvanized isolation is in communication with the input. The output conductors are in communication with the single-stage power factor correction without galvanized isolation. The output conductors include a first output conductor configured to connect a DC ground to a distribution transformer neutral and a second output conductor configured to deliver a positive DC voltage to a single DC bus.

Implementations of this aspect of the disclosure may include one or more of the following optional features. In some implementations, the non-isolated, three-phase rectifier further includes an ORing field-effect transistor connected to the second output conductor. The ORing field-effect transistor is configured to isolate the rectifier when a fault occurs. In some examples, the non-isolated, three-phase rectifier further includes an AC inrush and shutdown field-effect transistor and a bulk electrolytic capacitor. The AC inrush and shutdown field-effect transistor is connected to the second output conductor. The bulk electrolytic capacitor is connected to the first and second output conductors. The AC inrush and shutdown field-effect transistor limits current and charges the bulk electrolytic capacitor.

Yet another aspect of the disclosure provides a power conversion system including a plurality of non-isolated, three phase rectifiers and at least one distribution transformer. The plurality of non-isolated, three phase rectifiers are configured to operate in parallel. At least one of the plurality of non-isolated, three phase rectifiers includes an input, a single-stage power factor correction without galvanized isolation, and output conductors. The input is arranged to accept a six-phase AC voltage input having a half-wave rectified current. The single-stage power factor correction without galvanized isolation communicates with the input. The output conductors, which communicate with the single-stage power factor correction without galvanized isolation, include a first output conductor configured to connect a DC ground to a distribution transformer neutral and a second output conductor configured to deliver a positive DC voltage to a single DC bus. The at least one distribution transformer has a primary winding accepting three-phase AC power and a secondary winding with a center tap that forms a transformer neutral. The first output from the rectifier is directly connected to the distribution transformer neutral without isolation.

Implementations of this aspect of the disclosure may include one or more of the following optional features. In some implementations, the power conversion system further includes a rectifier diode configured to half-wave rectify the three-phase AC power at the secondary winding of the distribution transformer. The center tap at the secondary winding provides a six-phase voltage. The six-phase voltage may feed at least one of the plurality of rectifiers. The six-phase voltage may feed more than one of the plurality of rectifiers.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2A is a schematic view of a traditional power converter.

FIG. 3 is a schematic view of an isolated rectifier with a three-phase AC input.

FIG. 4A is a schematic representation of a data center with an AC power distribution system.

FIG. 4B is a schematic representation of a data center with a DC power distribution system.

Like reference symbols in the various drawings indicate like elements.

DETAILED DESCRIPTION

Figure 1A:
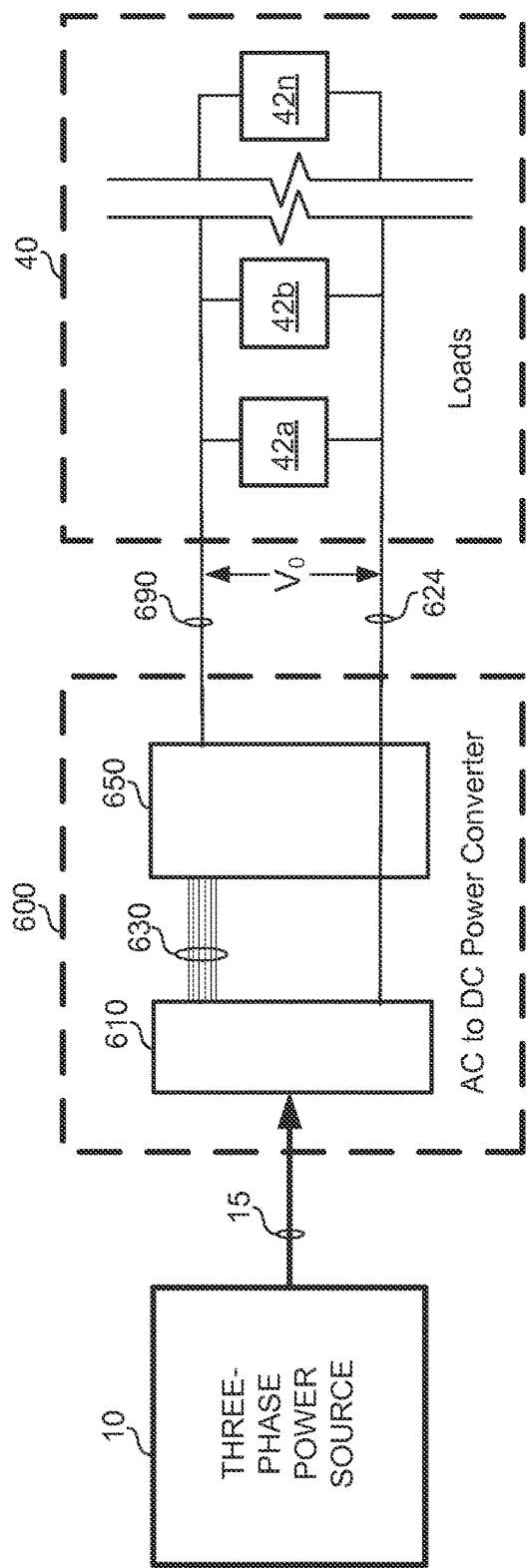
FIG. 1A is a schematic view of an AC to DC power converter in an example power system.
Figure 1B:
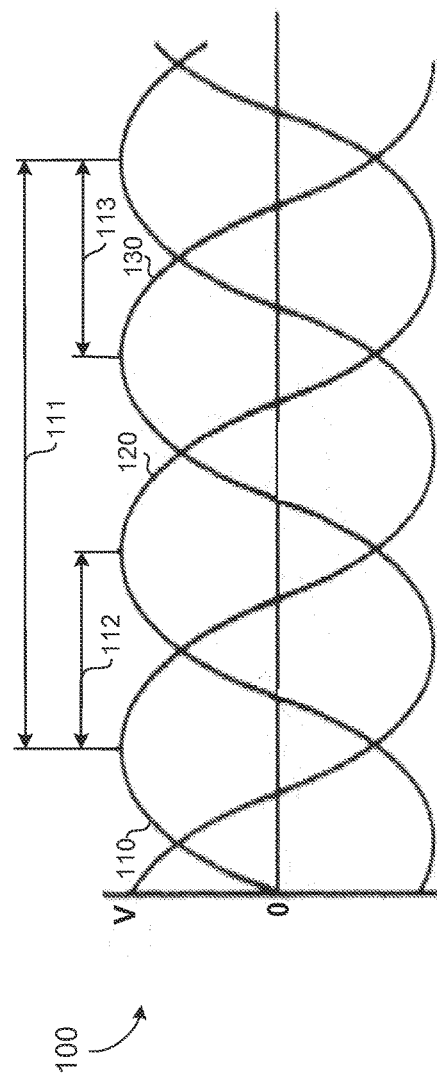
FIG. 1B is schematic representation of a three-phase AC power supply.
Figure 1C:
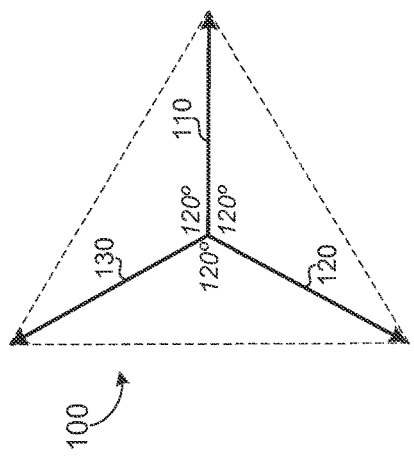
FIG. 1C is a vector diagram of the voltage of a three-phase AC power supply.
Figure 2B:
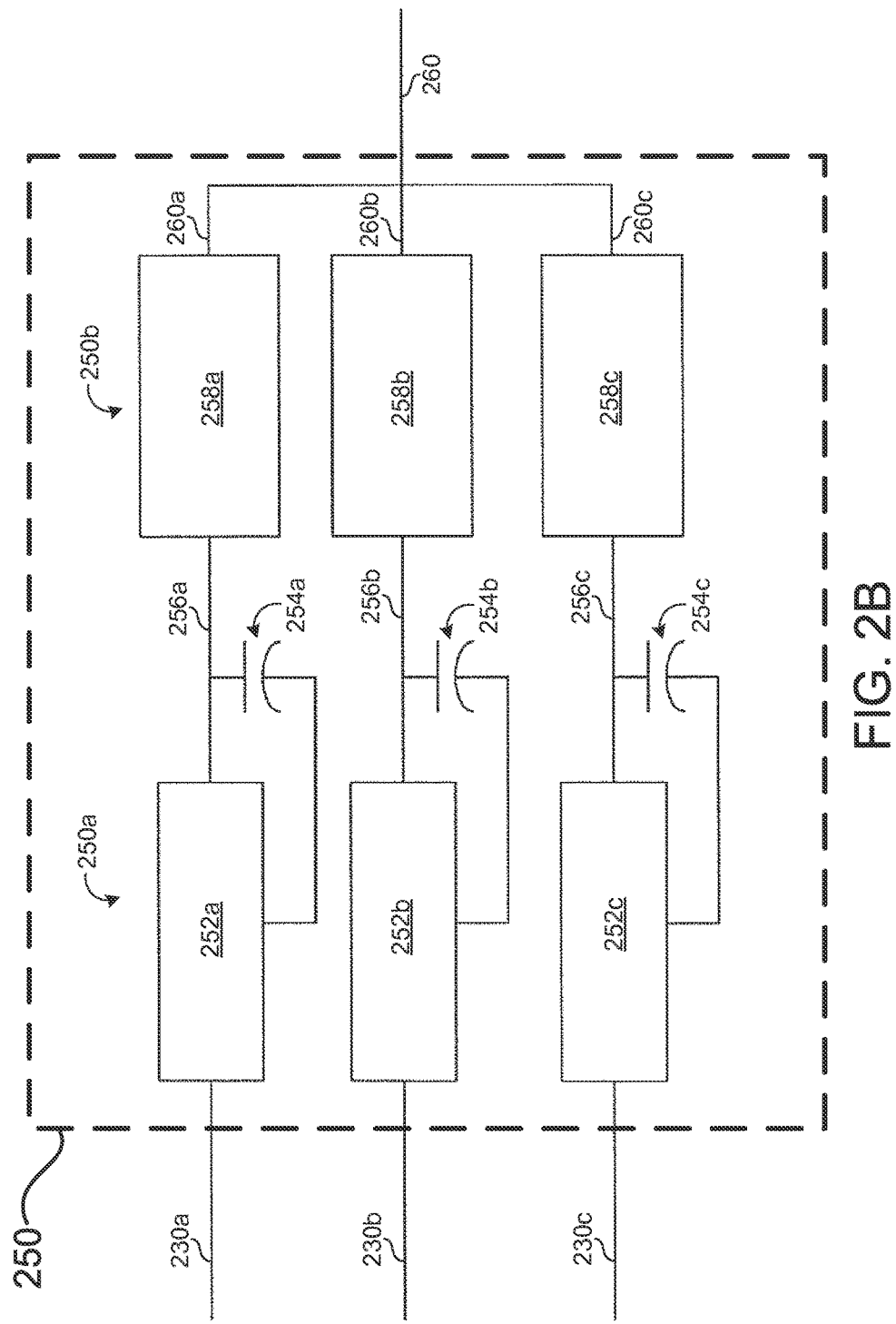
FIG. 2B is a schematic view of the isolated rectifier with three single-phase AC inputs.

Referring to FIG. 1A, an alternating current (AC) to direct current (DC) power converter 600 generally receives a supply of three-phase AC power 100 (illustrated in FIGS. 1B-1C) through a AC power system 15 from a three-phase power source 10. The power converter 600 may receive the three-phase AC power 100 and either as three single-phase inputs (as illustrated in FIG. 2A) or as one three-phase input (as illustrated in FIG. 3) and may convert the three-phase AC power 100 to DC power either in three single phase conversions (as illustrated in FIG. 2B) or as a single three-phase conversion (as illustrated in FIG. 3). Referring to FIG. 1B, the three-phase AC power supply 100 consists of a Phase A 110 sinusoidal power waveform, a Phase B 120 sinusoidal power waveform, and a Phase C 130 sinusoidal power waveform. Each phase has a 360° period 111 having 120° periodic offsets 112, 113 from each of the other phases. The three-phase AC power supply 100 may operate at different frequencies and with different voltages (V). The three phases 110, 120, 130 of the three-phase AC power supply 100 operate at the same frequency but with different phases. Referring to FIG. 1C, the voltages of Phase A 110, Phase B 120, and Phase C 130 are offset by 120°. Turning back to FIG. 1A, the power converter 600 may include a three-phase distribution transformer 610 and a three-phase rectifier 650 in communication through one or more AC wire conductors 630. The power converter 600 converts the incoming power from the three-phase AC power source 10 to a DC output signal having voltage $V_O$ across the DC output wire conductor 690 and the neutral wire conductor 624. Additional details concerning the power converter 600 are discussed hereinafter. Additionally, an alternate power converter (such as the single-phase power converter 900 of FIG. 9) along with its components could be substituted in place of the power converter 600 on FIG. 1A.

The DC power from the power converter 600 is distributed to a processing unit or structure 40. The processing unit or structure 40 could be a bay, a cabinet, a rack, a tray of a rack, a portable or stationary building (such as a home with DC appliances), a large facility (such as a data center), or any other group of DC loadings. The processing unit or structure 40 includes an integer number of DC loads 42a, 42b, . . . 42n. For example, the processing unit or structure 40 may include a single DC load 42a or may include a much larger number (n) of DC loads. In FIG. 1A, the DC power is shown distributed to the first DC load 42a, the second DC load 42b, and the n$^{th}$ DC load, which are arranged in parallel. However, the power converter 600 may provide DC power to a distribution system arranged much differently than the parallel loads of FIG. 1A.

Turning to FIG. 2A, a traditional AC to DC power converter 200 for commercial and high power applications, such as a converter for a data center, has an AC portion 220 and a DC portion 280 separated by an isolated rectifier 250. Referring to the AC portion 220, the traditional AC to DC power converter 200 relies on a 3-phase, 4-wire star (or wye) connected distribution transformer 222 with a neutral wire conductor 226 earth-grounded at an AC portion safety ground 224. The distribution transformer 222 provides a three-phase AC power supply 100, as described in FIGS. 1A-1B, into the isolated rectifier 250 with a Phase A waveform 110, a Phase B waveform 120, and a Phase C waveform 130. A first wire conductor 230a for the Phase A waveform 110, a second wire conductor 230b for the Phase B waveform 120, and a third wire conductor 230c for the Phase C waveform 130 deliver the three-phase AC power to the isolated rectifier 250 from the star connected distribution transformer 222. Each wire conductor 230a, 230b, 230c includes AC protection 228a, 228b, 228c.

Referring to the DC portion 280 of the traditional power converter 200, a DC-output wire conductor 290 carries DC output voltage from the isolated rectifier 250 to a positive DC voltage (+VDC) output terminal 286a. The DC-output wire conductor 290 includes DC protection 288. In addition to the positive output terminal 286a, the DC portion 280 also has a ground output terminal 286b connected to a DC-isolated neutral wire conductor 292. The DC portion 280 is grounded by a connection of the DC-isolated neutral wire conductor 292 to a DC-portion safety ground 284. An output capacitor 282 is also provided on the DC portion 280 of the traditional power converter 200, with the output voltage, $V_O$, (as illustrated in FIG. 1) across the output capacitor 282.

FIG. 2B illustrates the isolated rectifier 250 of the traditional power converter 200 of FIG. 2A. The isolated rectifier 250 has a three single-phase AC inputs from three wire conductors 230a, 230b, 230c. The isolated rectifier 250 operates as three parallel single-phase rectifiers. The isolated rectifier 250 is a two-stage converter, with each phase 110, 120, 130 of the AC voltage handled separately throughout both stages. The first stage 250a accomplishes power factor correction (PFC) rectification with a first PFC rectifier 252a converting the Phase A 110 AC power from the first wire conductor 230a, a second PFC rectifier 252b converting the Phase B 120 AC power from the second wire conductor 230b, and a third PFC rectifier 252c converting the Phase C 130 AC power from the third wire conductor 230c. This results in three independent DC BUS voltages in three separate DC wire conductors 256a, 256b, 256c. A DC voltage (for example, 400 VDC) develops across three capacitors—a first capacitor 254a in series with the first PFC rectifier 252a, a second capacitor 254b in series with the second PFC rectifier 252b, and a third capacitor 254c in series with the third PFC rectifier 252c—to form a positive DC voltage in each of the DC wire conductors 256a, 256b, 256c. The second stage 250b of the isolated rectifier 250 accomplishes DC-to-DC galvanic isolation/conversion with a first isolator 258a, a second isolator 258b, and a third isolator 258c. The isolators 258a, 258b, 258c may transfer high DC-link voltage to a lower voltage and may provide isolation. Three isolator-output wire conductors 260a, 260b, 260c—one from each isolator 258a, 258b, 258c—are connected together to provide a converter output wire conductor 260 that carrying a DC voltage (for example, 400 VDC). Prior to the combination of the DC voltage into the converter output wire conductor 260, the traditional power converter 200 separately handles, in parallel, each of the three single-phase AC inputs. U.S. Pat. No. 8,270,188, which is hereby incorporated by reference in its entirety, provides additional information of traditional power conversion similar to the conversion accomplished by traditional power converter 200.

The traditional power converter 200 of FIGS. 2A-2B is a widely used converter. However, there are some shortcomings of the power converter 200. Because there are three single-phase inputs, currents through each of the three inputs are not well balanced. Due to a second harmonic current (e.g. 120 Hz) flowing, the three capacitors 254a, 254b, 254c are highly stressed. Additionally, the two-staged conversion causes efficiency losses and operating cost increases. Additional details regarding power conversion for in telecommunication power systems are described in Kim, Sangsun et al., "Three-Phase Active Harmonic Rectifier (AHR) to Improve Utility Input Current THD in Telecommunication Power Distribution System," IEEE Transactions on Industry Applications vol. 39, no. 5 (September/October 2003) pp. 1414-1421, which is hereby incorporated by reference in its entirety.

Referring to FIG. 3, an isolated rectifier 350 having a single three-phase input is commercially available and could replace the isolated rectifier 250 having three single-phase inputs. The single three-phase input of the isolated rectifier 350 receives the three phase AC input from a wire conductor 330. Similar to the single-phase isolated rectification of isolated rectifier 250, the three-phase isolated rectifier 350 also utilizes a two-stage conversion process. The first stage 350a accomplishes power factor correction (PFC) rectification with a PFC rectifier 352 converting the input three-phase AC power. After the PFC rectifier 352, a capacitor 354 is provided across which a DC voltage (for example, 700 VDC) develops to form a positive DC voltage in a DC wire conductor 356. The second stage 350b of the isolated rectifier 350 accomplishes DC-to-DC galvanic isolation/ conversion with an isolator 358. An output wire conductor 360 carries a DC voltage (for example, 400 VDC) beyond the isolated rectifier.

While the isolated rectifier 350 may relieve some of the stress on the capacitor 354 due to AC current balancing resulting from the three-phase configuration, relying on a single three-phase isolated rectifier 350 for data center power can introduce inefficiencies, complications, and expenses. An AC voltage of 480V input into the PFC rectifier 352 might create as much as 700-800 VDC across the capacitor 354. This is very problematic for facilities such as data centers, and the isolator 358 does not function reliably with voltage inputs at that level. Raising the current in order to lower the AC voltage input into the PFC rectifier 352 is also problematic as high current levels do not work well in data centers. Additionally, the isolated rectifier 350 does not correct the inefficiency shortcomings of the isolated rectifier 250 that are attributable to the two-staged conversion.

Due to the problems associated with known three-phase rectification, the traditional single phase isolated rectifier 250 is the primary source AC to DC power conversion. Since this also associates with significant inefficiencies and other shortcomings, this disclosure presents an AC to DC power convertor for data centers that provides for opportunities to increase conversion efficiency. An efficient AC to DC power converter addressing the issues of the traditional AC to DC power converter 200 may also support a simpler transition to DC power distribution in the data center. Referring to FIG. 4A, a data center 400a may have an AC side power distribution network 440a. The data center 400a receives AC power from an incoming power line 420a that splits into a power distribution network 440a within the data center 400a to deliver power to an integer number of loads (shown is six loads, L1-L6, in data center 400a). While the incoming power line 420a and power feed lines 441a-446a of the power distribution network 440a carries AC power, each of the loads—which may be data center equipment such as computer racks or networking equipment—may operate on DC power. Accordingly, a traditional AC to DC power converter 200a-200f is utilized on each power feed line 441a-446a to deliver DC power to the loads from the AC power distribution network 440a.

Referring to FIG. 4B, a data center 400b with a DC power distribution network 440b requires an efficient AC to DC power converter 600 upstream of the power distribution within the data center 400b. The power converter 600 resides on incoming power line 420b downstream of a transformer and switchgear (not shown) but upstream of a power distribution unit. In data center 400b, each power feed line 441b-446b of the power distribution network 440b carries DC power to meet the DC power requirement of the loads. Unlike AC power distribution data center 400a, the loads of data center 400b may connect to the same DC bus. Additional information regarding AC-to-DC conversion for DC power distribution to multiple DC loads is described in U.S. Pat. No. 8,624,433, which is hereby incorporated by reference in its entirety.

In contrast to the simplified FIGS. 4A-4B, actual data centers 400 may have load requirements exceeding a megawatt. Accordingly, to supply power for that level of load requirement, more than forty power converters may be operated in parallel. More detail on the parallel operation and control of multiple converters is described in Kim, Sangsun et al., "Control of Multiple Single-Phase PFC Modules with a Single Low-Cost DSP," IEEE Transactions on Industry Applications vol. 39, no. 5 (September/October 2003) pp. 1379-1385, which is hereby incorporated by reference in its entirety. The efficient AC to DC power converter 600 disclosed herein may present different issues for parallel operations than the traditional single-phase power converter 200.

Figure 5:
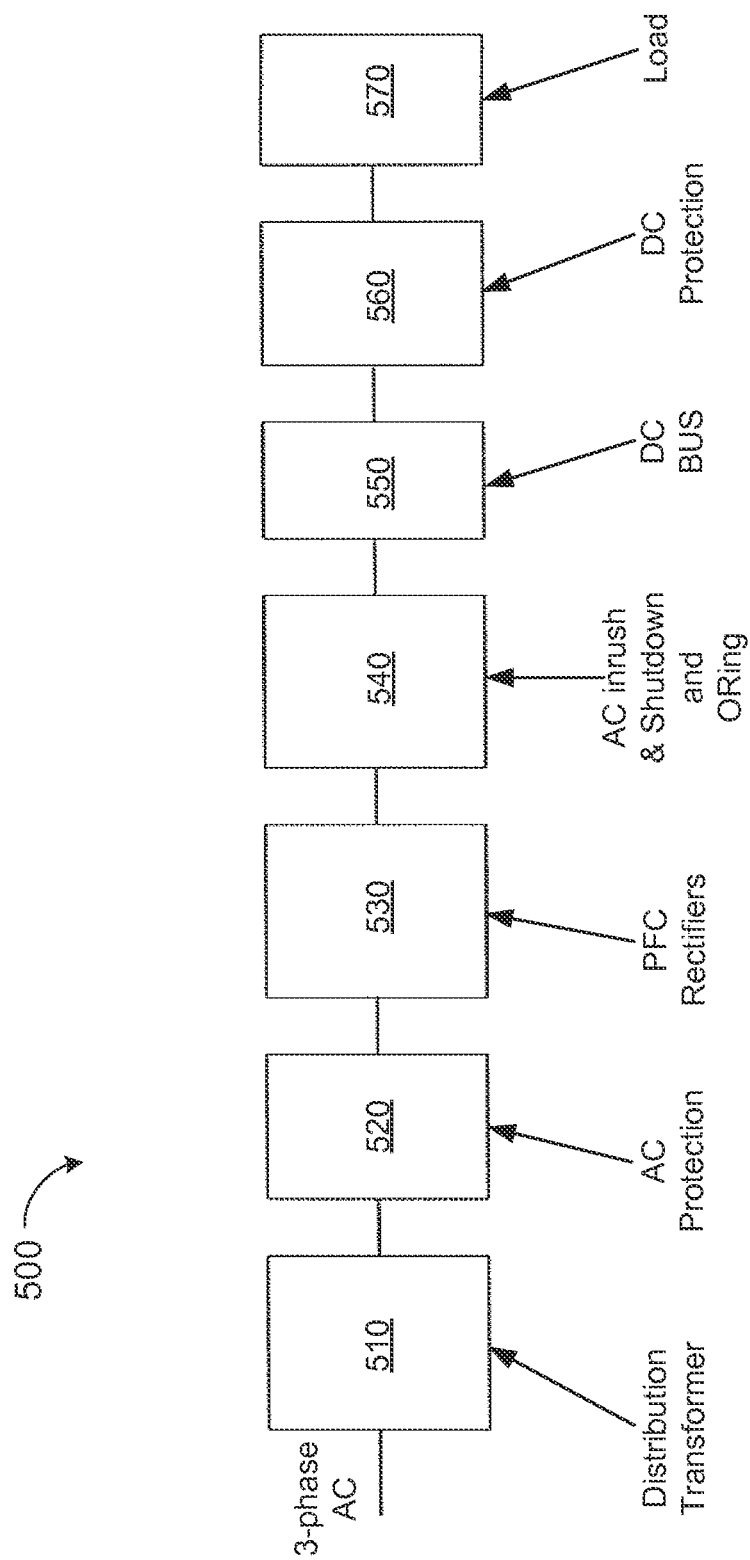
FIG. 5 is a block diagram of a system for efficient AC to DC power conversion.

FIG. 5 provides a block diagram sequentially illustrating the components of an efficient system 500 of AC to DC power conversion that may be realized by the efficient AC to DC power converter 600 (illustrated in FIG. 6). The system 500 utilizes a three-phase AC input. The three-phase AC power first reaches a distribution transformer 510. Next, the system 500 includes AC protection 520 followed by power factor correction (PFC) rectifiers 530. The system 500 includes protective features in the form of AC inrush and shutdown along with ORing 540. The DC BUS 550 and DC Protection 560 precede the system 500 delivering power to the load 570.

Figure 6A:
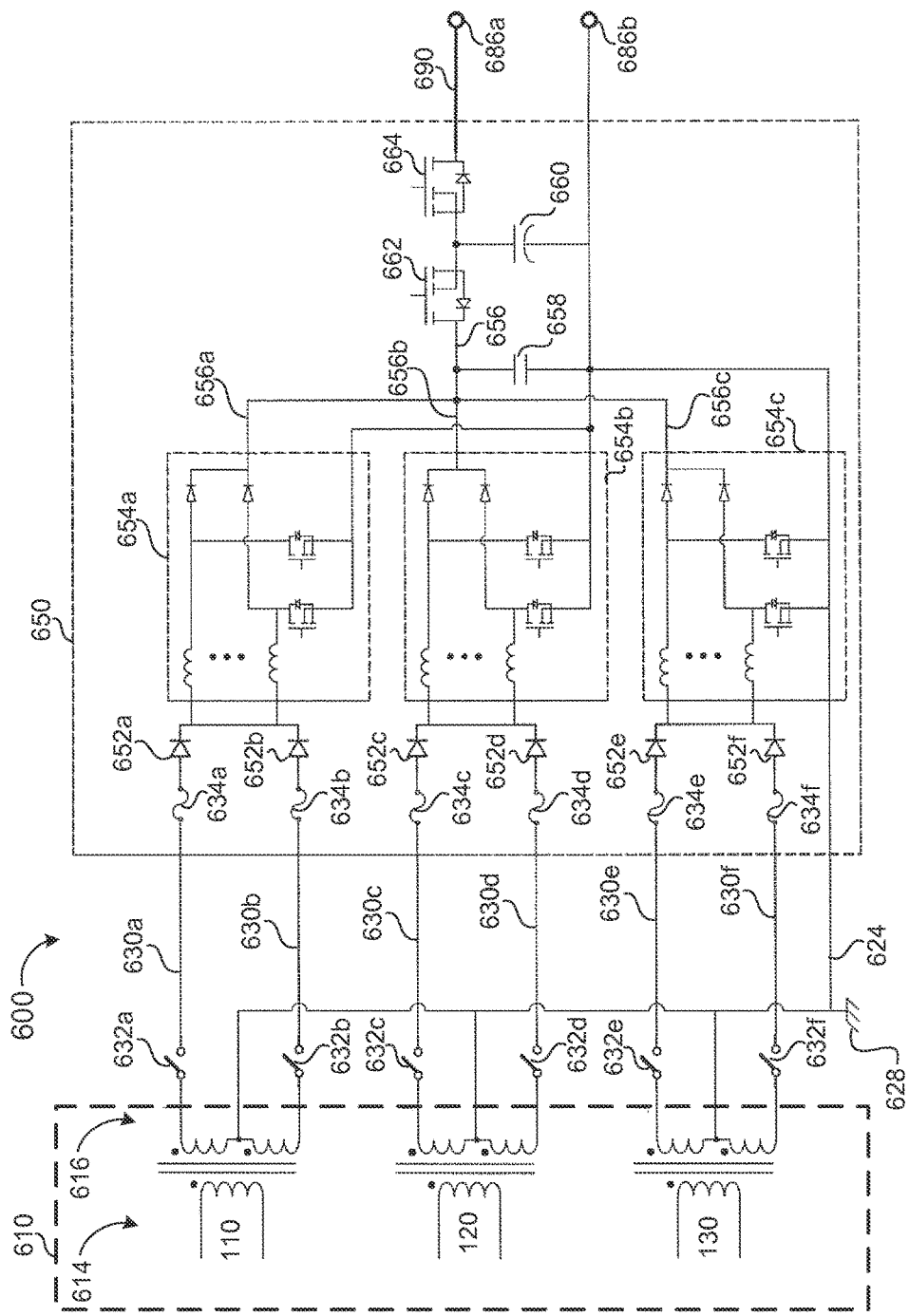
FIG. 6A is a schematic view of an efficient AC to DC power converter.
Figure 6B:
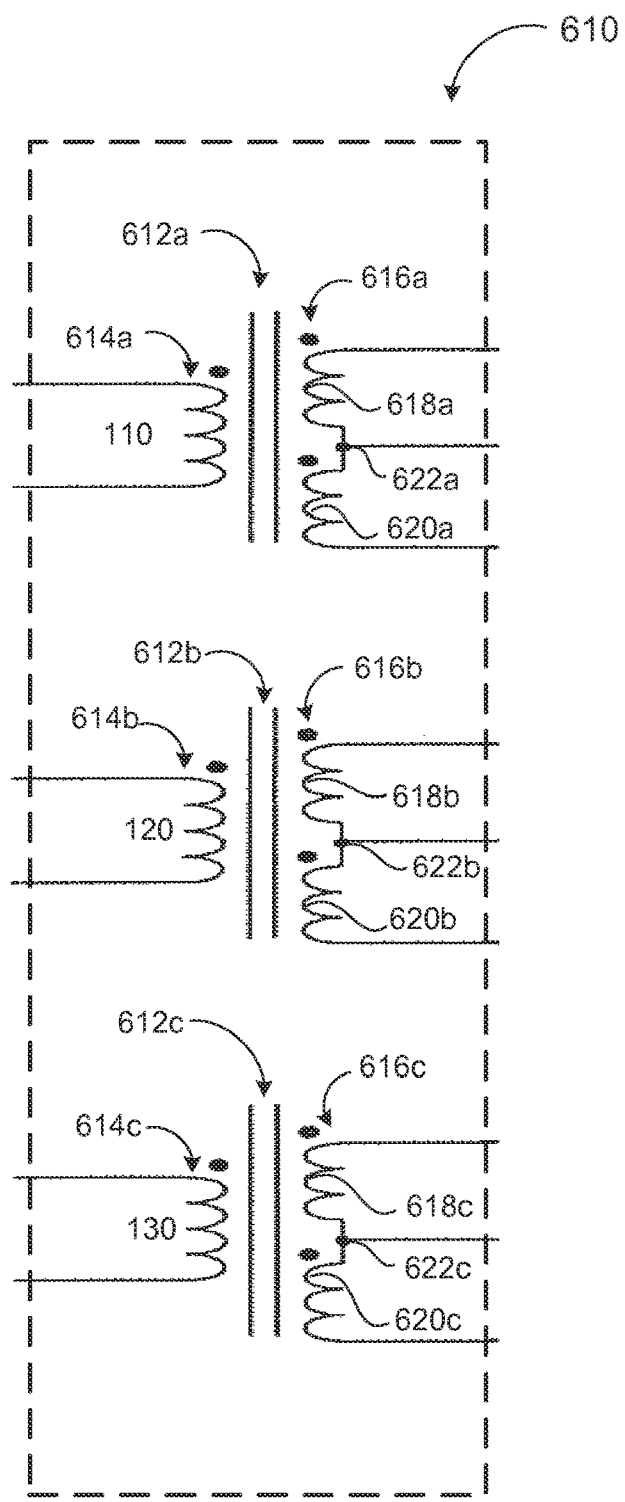
FIG. 6B is a schematic view of the three-phase distribution transformer of the power converter of FIG. 6A.

Turning to FIGS. 6A-6B, the power converter 600 receives three-phase AC power 100 in the form of a Phase A 110, a Phase B 120, and a Phase C 130. The power converter 600 includes a three-phase distribution transformer 610 with a primary side 614 receiving the three-phase AC power 100 and a secondary side 616 carrying the transformed AC power (which may be of the form illustrated in FIGS. 7A-7B and as described hereinafter). The three-phase distribution transformer 610 receives the three-phase AC power 100 at a Phase A transformer portion 612a, a Phase B transformation portion 612b, and a Phase C transformer portion 612c. The Phase A transformer portion 612a has a primary side 614a that receives Phase A 110 of the three-phase AC power 100 and a secondary side 616a including a first secondary winding 618a, a second secondary winding 620a, and a center tap 622a. The Phase B transformer portion 612b has a primary side 614b that receives Phase B 120 of the three-phase AC power 100 and a secondary side 616b including a first secondary winding 618b, a second secondary winding 620b, and a center tap 622b. The Phase C transformer portion 612c has a primary side 614c that receives Phase C 130 of the three-phase AC power 100 and a secondary side 616c including a first secondary winding 618c, a second secondary winding 620c, and a center tap 622c.

Figure 7A:
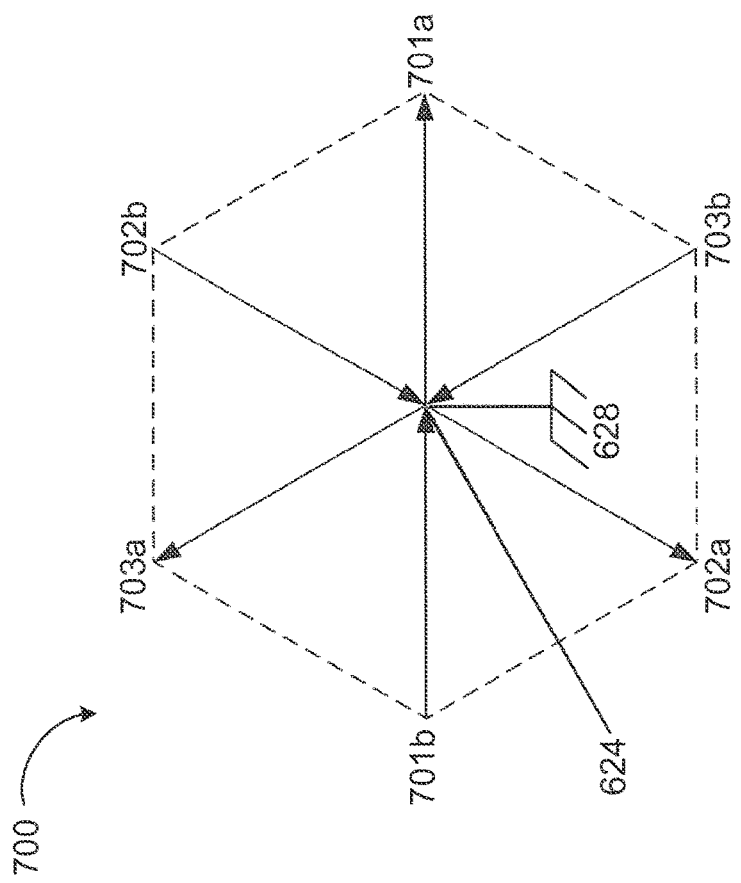
FIG. 7A is a vector diagram of the AC voltage on the secondary side of the distribution transformer of FIG. 6B.

As previously described and as illustrated in FIG. 1A, each phase of the three-phase AC power supply 100 consists of a full sinusoidal waveform with voltage spread at 120° from the voltage of the other phases. This three-phase AC power supply 100 at the primary side of the distribution transformer 610 has a primary-side current that is a full-wave rectified sinusoidal AC current. Referring to FIG. 7A, the 3-phase distribution transformer 610 of the power converter 600 produces 6-phase AC voltage 700 by separating the positive voltage $(+V_A)$ 701a and negative voltage $(-V_A)$ 701b components of Phase A 110, separating the positive voltage $(+V_B)$ 702a and negative voltage $(-V_B)$ 702b components of Phase B 120, and separating the positive voltage $(+V_C)$ 703a and negative voltage $(-V_C)$ 703b components of Phase C 130. The resulting AC power 700 at the output of the distribution transformer 610 has six different voltages with a 60° phase shift between voltages. The 6-phase AC power 700 includes a neutral wire conductor 624 and a safety ground 628.

Returning to FIGS. 6A-6B, from the first secondary winding 618a of the Phase A transformer portion 612a of the distribution transformer 610, an AC wire conductor 630a arranged with an AC breaker 632a and an AC fuse 634a carries the positive voltage 701a of Phase A 110 to the 3-phase rectifier 650. From the second secondary winding 620a of the Phase A transformer portion 612a of the distribution transformer 610, an AC wire conductor 630b arranged with an AC breaker 632b and an AC fuse 634b carries the negative voltage 701b of Phase A 110 to the 3-phase rectifier 650. From the first secondary winding 618b of the Phase B transformer portion 612b of the distribution transformer 610, an AC wire conductor 630c arranged with an AC breaker 632c and an AC fuse 634c carries the positive voltage 702a of Phase B 120 to the 3-phase rectifier 650. From the second secondary winding 620b of the Phase B transformer portion 612b of the distribution transformer 610, an AC wire conductor 630d arranged with an AC breaker 632d and an AC fuse 634d carries the negative voltage 702b of Phase B 120 to the 3-phase rectifier 650. From the first secondary winding 618c of the Phase C transformer portion 612c of the distribution transformer 610, an AC wire conductor 630e arranged with an AC breaker 632e and an AC fuse 634e carries the positive voltage 703a of Phase C 130 to the 3-phase rectifier 650. From the second secondary winding 620c of the Phase C transformer portion 612c of the distribution transformer 610, an AC wire conductor 630f arranged with an AC breaker 632f and an AC fuse 634f carries the negative voltage 703b of Phase C 130 to the 3-phase rectifier 650.

Figure 7B:
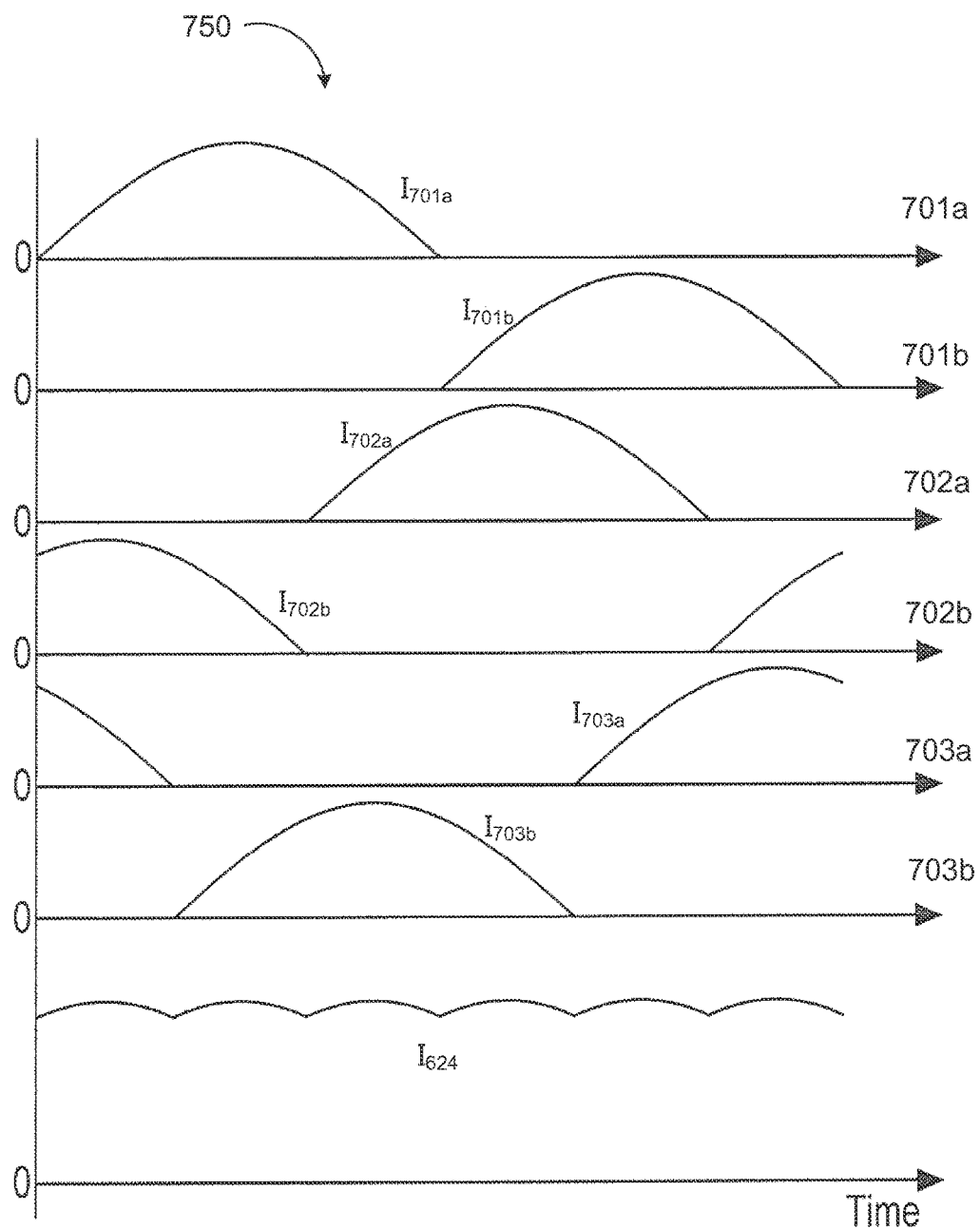
FIG. 7B is a schematic representation of the AC currents associated with the power converter of FIG. 6A.

A first rectifier diode 652a, a second rectifier diode 652b, a third rectifier diode 652c, a fourth rectifier diode 652d, a fifth rectifier diode 652e, and a sixth rectifier diode 652f reside within the three-phase rectifier 650. Each of these six rectifier diodes 652a-f perform a one-way function on the current of each of the six AC phases on the secondary side of the distribution transformer 610. The electric current of these six phases are only able to pass in the forward direction through the six rectifier diodes 652a-f. Accordingly, the current waveforms, which were full-wave sinusoidal AC current at the primary side of the distribution transformer, are transformed to half-sinusoidal waveforms. Referring to FIG. 7B, the current (I) waveforms 750 of the six AC phases on the secondary side of the distribution transformer 610 are half-wave rectified due to the presence of the six rectifier diodes 652a-f within the 3-phase rectifier 650. Despite the half-wave rectified current flowing through the AC wire conductors 630a-f, the AC breakers 632a-f and the AC fuses 634a-f discussed previously and shown on FIG. 6A are rated for AC, rather than rated for DC. This AC rating is generally more cost-effective.

Returning to FIG. 6A, in addition to the six rectifier diodes 652a-f, the 3-phase rectifier 650 houses at least one boost converter 654 per AC phase to perform the power factor correction in conformance with the three-phase configuration of the rectifier 650. The boost converters 654 transform the AC current such that the AC current approaches the unitary power factor. In the implementation of FIG. 6, the three-phase rectifier 650 includes a first boost converter 654a arranged for power factor correction of Phase A 110, a second boost converter 654b arranged for power factor correction of Phase B 120, and a third boost converter 654c arranged for power factor correction of Phase C 130. In alternative implementations, two or three boost converters 654 could be interleaved in parallel configuration for each of the three phases. The boost-converter-output wire conductor 656a from boost converter 654a, the boost-converter-output wire conductor 656b from boost converter 654b, and the boost-converter-output wire conductor 656c from boost converter 654c combine together to form a single DC BUS 656 within the three-phase rectifiers 650.

Notably, the three-phase rectifier 650 performs single-stage rectification. Namely, power factor correction (by the boost converters 654a, 654b, 654c) power conversion occurs without galvanic isolation. This enables a connection between the AC and DC portions through a neutral combined conductor 624. The center taps 622a, 622b, 622c on the secondary winding of the three-phase distribution transformer 610 are each connected to the neutral wire conductor 624 that also directly connects to the DC side of the boost converters 654a, 654b, 654c. The neutral conductor 624 has a single safety ground 628 that consists of solid, low-, or high-impedance grounding. Referring to FIG. 7B, the neutral current $I_{624}$, which is a sum of the six phase currents and which flows through the neutral wire conductor 624, resembles a DC current. However, this neutral current flowing through the neutral wire conductor 624 may be large because the six phases are half-wave rectified currents.

Figure 8:
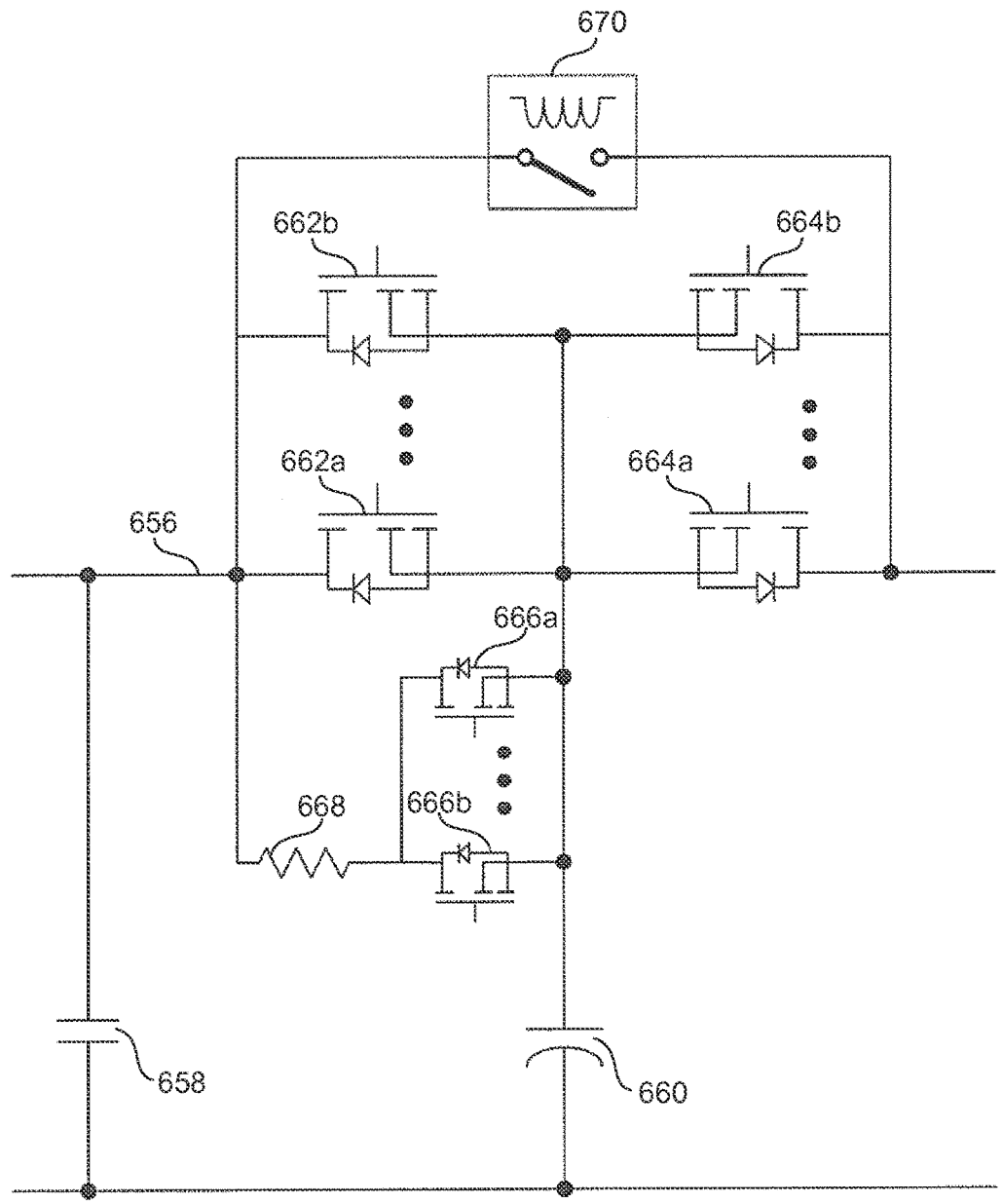
FIG. 8 is a schematic view of the DC power portion of the rectifier of the power converter of FIG. 6A.

Referring back to FIG. 6A, a first capacitor 658 and a bulk electrolytic capacitor 660 are arranged between the neutral wire conductor 624 and the positive DC wire conductor 656. Two field-effect transistors (FETs), $Q_1$ 662 and $Q_2$ 664, are integrated into the DC wire conductor 556. Referring to FIG. 8, the AC current may be large during the initial charging of the bulk capacitor 660. $Q_1$ 662 provides some AC inrush protection and can shut down or disable output. The circuit of $Q_1$ 662 is integrated into the DC wire conductor 656 along with the disabling/shut-down feature rather than providing an AC-rated inrush feature. $Q_1$ 662 operates to limit the current and to charge up the bulk capacitor 660. $Q_1$ 662 can exist as a single integrated FET (as illustrated in FIG. 6A) or as more than one parallel FET (as illustrated in FIG. 8 with numbering of 662a and 662b). The three-phase rectifier 650 may rely on the $Q_1$ FET(s) 662 (as illustrated in FIG. 6A)—or an alternative mechanism may be utilized—to limit AC inrush current. Regarding the alternative mechanism, as shown in FIG. 8, a resistor 668 and one or more $Q_3$ FET(s) 666a, 666b may operate to limit an AC inrush current. When AC inputs are applied, either $Q_3$ 666a, 666b is turned on to charge up the bulk capacitor 660 or $Q_1$ 662a, 662b operates to limit the current and charge up the bulk capacitor 660.

As described previously, multiple power converters 600 may be operated in parallel to provide power to the loadings of a data center 400. If a single rectifier 650 failed (for example, at a boost converter 654), a negative current could flow through the DC output to short circuit the system. However, a single $Q_2$ FET 664 (as illustrated in FIG. 6A) or more than one parallel $Q_2$ FETs 664a, 664b (as illustrated in FIG. 8) provides ORing by turning off to isolate the fault to the failed unit. An optional contactor 670 may be integrated into the DC wire conductor 556 to lower the conduction loss on $Q_1$ 662 and $Q_2$ 664. FETs provide some resistance that may result in power dissipation. After turning on both $Q_1$ 662 and $Q_2$ 664, the contactor 670 may close to avoid the power dissipation through $Q_1$ 662 and $Q_2$ 664. Before turning off either $Q_1$ 662 or $Q_2$ 664, the contactor 670 must be turned off first. Both the contactor 670 and $Q_3$ 666 are optional features that need not be utilized in all implementations of the power converter 600.

Referring to the DC output of the power converter 600, a DC output wire conductor 690 carries DC output voltage from the three-phase rectifier 650 to a positive DC voltage (+VDC) output terminal 686a. In addition to the positive output terminal 686a, the DC output from the power converter 600 also has a ground output terminal 686b.

Turning back to FIG. 5, the system 500 begins at a distribution transformer 510, which corresponds to the three-phase distribution transformer 610 of the power converter 600. As previously discussed, the secondary side 616 of the distribution transformer 610 has a center tap 622 on the secondary winding to form six phases at the secondary side 616, with the AC currents at the secondary windings implemented as half-wave rectified current due to one-way functioning of the six rectifier diodes 652a-f. The primary side of the three-phase distribution transformer 610 may vary in form without affecting the power converter 600. A star connection, a delta connection, or some other three-phase connection may be utilized on the primary side of the distribution transformer 610.

The AC protection 520 of the system 500 is accomplished by the breakers 632. Additional AC side protection 520 is required as compared to traditional AC to DC power conversion. The PFC rectifiers 530 of the system accomplish three-phase, single-stage, non-isolated rectification. The absence of a galvanic isolation stage increases efficiency and power density of the rectifier 650. Utilizing three-phase rectification balances the AC line power to avoid stressing the bulk capacitor 660. AC inrush and shutdown along with ORing 540 of the system is accomplished by $Q_1$ 662 and $Q_2$ 664 as discussed previously. A single DC BUS 550 outputs DC power from the three-phase rectifier 650 for DC power distribution to multiple loads. As an example, the DC BUS 550 of the system 500 may carry 400V DC output. The DC BUS ground (or return) is tied to the AC neutral wire conductor 624 for safety grounding. DC protection 560, such as a fuse or a semiconductor, may be provided right in front of the load 570. The DC protection 560 need only be installed on one wire conductor 690.

Figure 9:
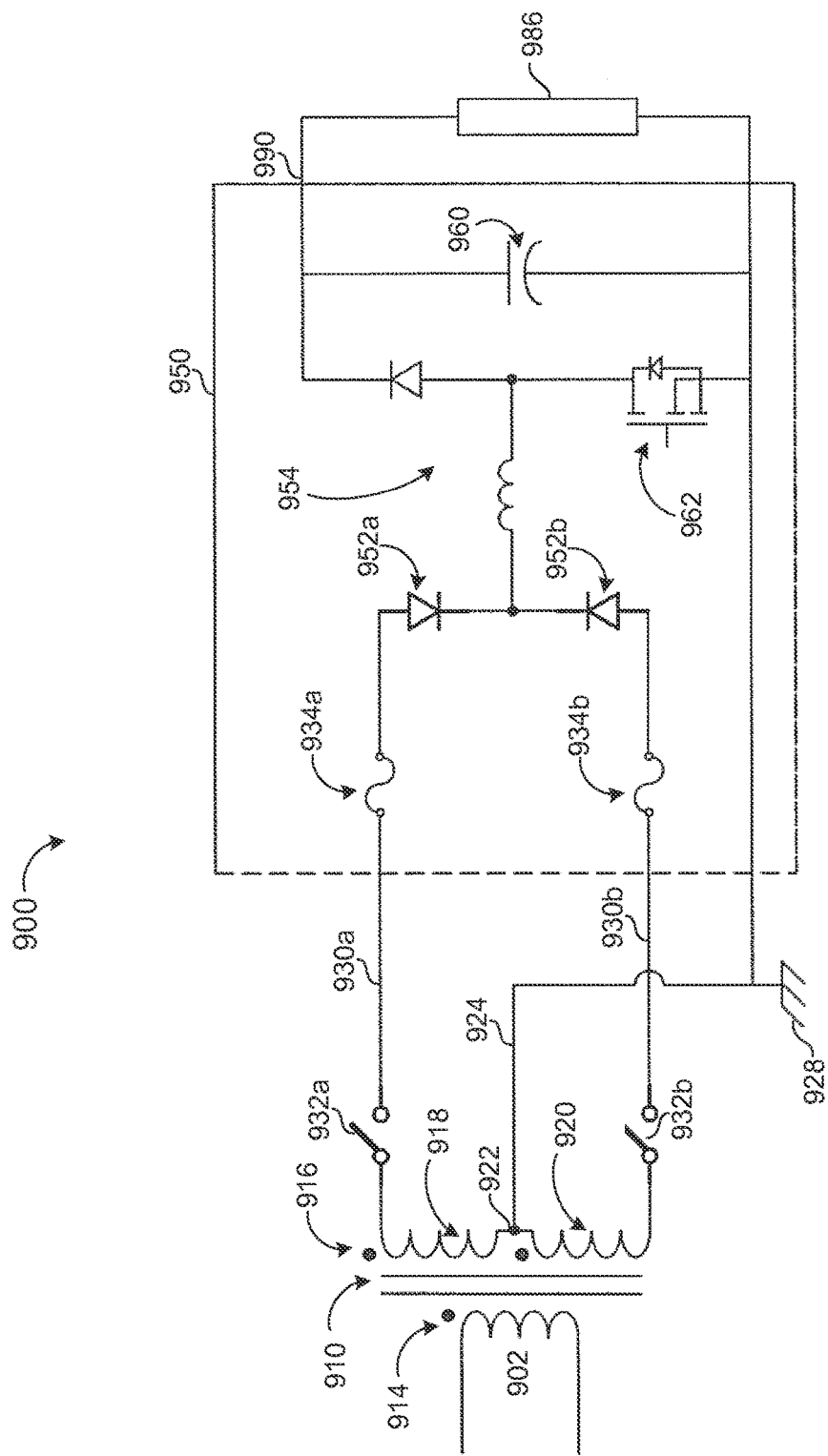
FIG. 9 is a schematic view of an efficient AC to DC power converter with a single-phase distribution transformer.

Referring now to FIG. 9, the power converter of this disclosure may be implemented as a single-phase (or split phase) power converter 900. The power converter 900 may receive a single-phase (or split-phase) AC power supply 902 at a primary winding 914 of a single-phase distribution transformer 910. The secondary winding 916 of the distribution transformer 910 has a center tap 922 splitting the secondary winding 916 into a first portion 918 and a second portion 920. An AC wire conductor 930a carries a split voltage from the first portion 918 of the secondary winding 916 of the distribution transformer 910 through a breaker 932a and a fuse 934a. A rectifier diode 952a of the single-phase (or split-phase) rectifier 950 converts the AC current within an AC wire conductor 930a into a half-wave rectified current. An AC wire conductor 930b carries a split voltage from the second portion 920 of the secondary winding 916 of the distribution transformer 910 through a breaker 932b and a fuse 934b. A rectifier diode 952b of the single phase (or split-phase) rectifier 950 converts the AC current in an AC wire conductor 930b into a half-wave rectified current. A power factor correction (PFC) 954 converts the AC power to DC power that is carried through a positive DC voltage (+VDC) conductor 990 to a DC load 986. A neutral wire conductor 924 connects the DC side of the power converter 900 to the AC side of the power converter 900 at the center tap 922 of the distribution transformer 910. The neutral wire conductor 924 grounds both the DC power and the AC power at safety ground 928. While the single-phase (or split-phase) power converter 900 maintains the shortcomings of traditional power converters 200 attributable to single-phase conversion, the power converter 900 has a single-stage rectifier 954, which removes inefficiencies attributable to galvanic isolation of traditional rectification.

Figure 10:
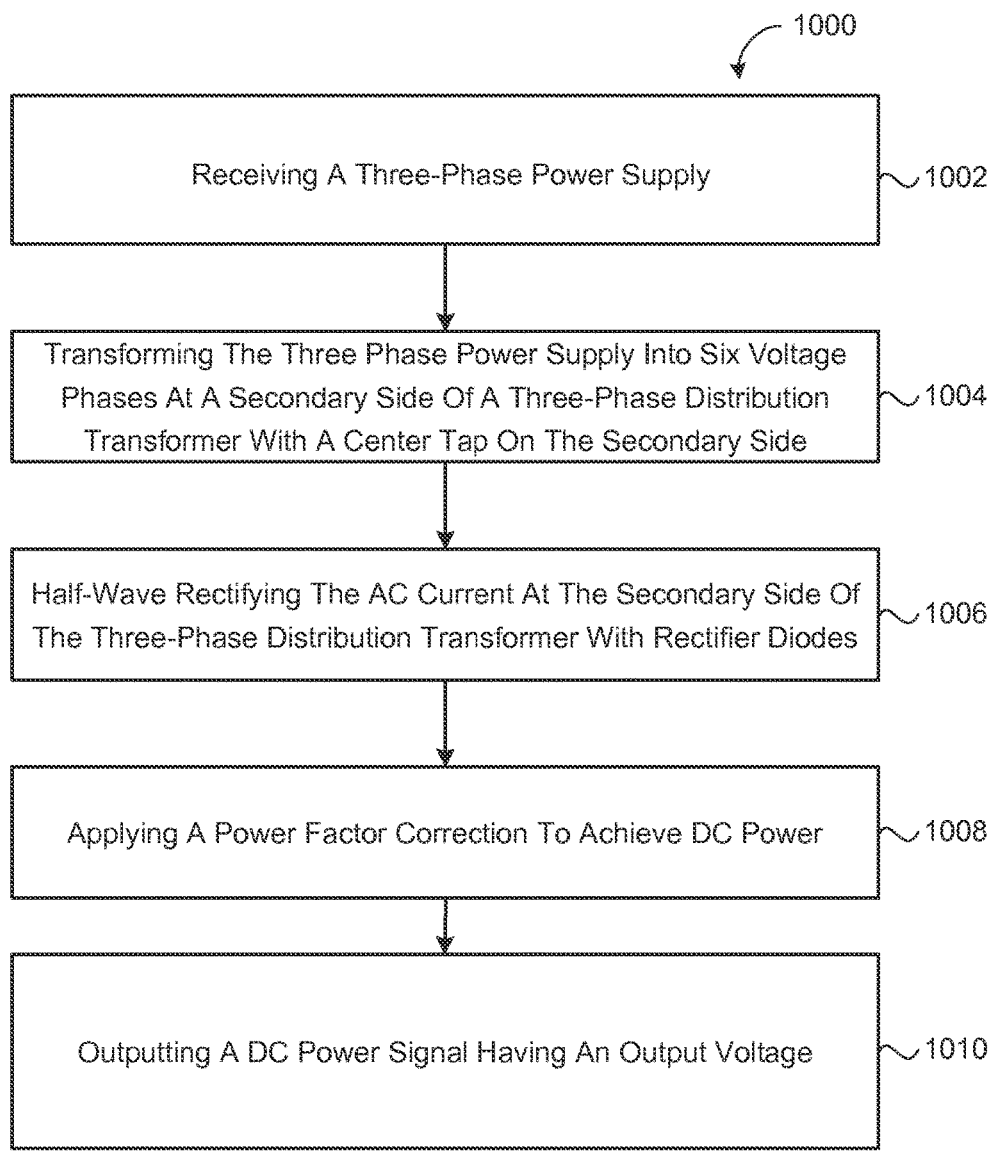
FIG. 10 is a schematic view of an exemplary arrangement of operations for converting AC power to DC power in a non-isolated power converter.

FIG. 10 illustrates an exemplary arrangement of operations of a method 1000 for converting AC power to DC power in a non-isolated power converter 600. At block 1002, the method 1000 includes receiving a three-phase power supply 100. The three phase power supply may originate at a three-phase power source 10, and the power converter 600 may receive the three-phase power supply 100 through an AC power system 15. At block 1004, the method 1000 includes transforming the three-phase power supply 100 into six voltage phases at a secondary side 616 of a distribution transformer 510, such as the three-phase distribution transformer 610. For example, this six-phase voltage transformed AC power 700 may form by dividing Phase A 110 of the three-phase AC power 100 into positive voltage $(+V_A)$ 701a and negative voltage $(-V_A)$ 701b components, dividing Phase B 120 of the three-phase AC power 100 into positive voltage $(+V_B)$ 702a and negative voltage $(-V_B)$ 702b components, and dividing Phase C 130 of the three-phase AC power 100 into positive voltage $(+V_C)$ 703a and negative voltage $(-V_C)$ 703b components. Each phase 110, 120, 130 of the three-phase AC power 100 may be divided between a first secondary winding 618a, 618b, 618c and a second secondary winding 620a, 620b, 620c divided by center taps 622a, 622b, 622c on the secondary side 616 of the three-phase distribution transformer 610. The configuration on the primary side 614 of the three-phase distribution transformer 610 may differ between different implementations. For example, a three-phase delta connection, a three-phase star connection, or come other configuration may exist on the primary side 614 of the three-phase distribution transformer 610. The center taps 622a, 622b. 622c on the secondary side 616 of the three-phase distribution transformer 610 connect together at a neutral wire connector 624 that is grounded at safety ground 628, which consists of solid, low-, of high-impedance grounding. Wires conductors—such as a first AC wire conductor 630a, a second AC wire conductor 630b, a third AC wire conductor 630c, a fourth AC wire conductor 630d, a fifth AC wire conductor 630e, and a sixth AC wire conductor 630f—may carry the transformed AC power 700 from the secondary side 616 of the three-phase distribution transformer 610.

At block 1006, the method 1000 includes half-wave rectifying the AC current at the secondary side 616 of the three-phase distribution transformer 610. Rectifier diodes—such as a first rectifier diode 652a on the first AC wire conductor 630a, a second rectifier diode 652b on the second AC wire conductor 630, a third rectifier diode 652c on the third AC wire conductor 630c, a fourth rectifier diode 652d on the fourth AC wire conductor 630d, a fifth rectifier diode 652e on the fifth AC wire conductor 630e, and a sixth rectifier diode 652f on the sixth AC wire conductor 630f— perform a one-way current function which results in half-wave rectification of the AC currents. AC Protection 520, such as a first AC breaker 632a, a second AC breaker 632b, a third AC breaker 632c, a fourth AC breaker 632d, a fifth AC breaker 632e, and a sixth AC breaker, may be provided on the At block 1008, the method 1000 includes applying a power factor correction to achieve DC power. The power factor correction may occur within a PFC Rectifier 530, such as the three-phase rectifier 650 of FIG. 6A. In one example, a first boost converter 654a applies the power factor correction to the transformed Phase A 110, a second boost converter 654b applies the power factor correction to the transformed Phase B 120, and a third boost converter 654c applies the power factor correction to the transformed Phase C 130. In other examples, more than one boost converter, connected in parallel, accomplish the power factor correction on each transformed phase. In still other examples, some other power factor correction mechanism performs the power factor correction. The power factor correction converts the transformed AC power into a substantially unitary power factor. The three-phase rectifier 650 may also include protective features in the form of AC inrush and shutdown along with ORing 540. An inlet control feature, such as Shutdown (Q1) FET 662, may provide AC inrush and shutdown protection. This AC inrush and shutdown protection may also be provided by multiple shutdown (Q1) FETs (e.g., 662a, 662b) connected in parallel. A mechanism for isolating a faulted power converter 600 (for example, when a power system includes multiple power converters 600 connected in parallel), such as an ORing (Q2) FET 664, may provide ORing protection. This ORing protection may also be provided by multiple ORing (Q2) FETs (e.g., 664a, 664b) connected in parallel or by an alternate arrangement of one or more Q3 FETs 666a. 666b and resistor 668. A contactor 670 may be arranged in parallel to any FETs 540 to lower the conduction loss.

At block 1010, the method 1000 includes outputting a DC power signal having an output voltage, $V_O$. The output side of the power converter 600 may consist of a DC Bus 550, which may include a positive DC output 686a and a DC output ground 686b. A DC output wire conductor 690 communicates with the positive DC output 686a. The neutral wire conductor 624 communicates with the DC output ground 686b. The neutral wire conductor 624 may form a non-isolated connection between the AC power (at the first center tap 622a, the second center tap 622b, and the third center tap 622c of the secondary side 616 of the three-phase distribution transformer 610) and the DC power. The output voltage, $V_O$, from the power converter 600 may be measured across one or more capacitors 658, 660. The output DC power signal from the power converter 600 may power one or more DC loads 570. DC protection 560, such as a fuse or a semiconductor, may be arranges upstream of the one or more DC loads 570.

While FIG. 10 and the preceding description of method 1000 refer to the power converter 600 for a three-phase system, an alternate power converter (such as the single-phase power converter 900 of FIG. 9) along with its components could be substituted in place of the power converter 600 on FIG. 10 and in the method 1000 without deviating from the scope of this disclosure.

A number of implementations have been described. Nevertheless, it will be understood that various modifications may be made without departing from the spirit and scope of the disclosure. Accordingly, other implementations are within the scope of the following claims.

What is claimed is:

1. A method for converting alternating current (AC) power to direct current (DC) power in a non-isolated power converter, the method comprising:
   receiving a three-phase power supply, the three-phase power supply having an AC current that is a full-wave sinusoidal AC current;
   transforming the three phase power supply into six voltage phases at a secondary side of a three-phase distribution transformer, the three-phase distribution transformer comprising a center tap on the secondary side and one or more AC wire conductors carrying the transformed power supply;
   half-wave rectifying the AC current at the secondary side of the three phase distribution transformer, the half wave rectification accomplished by an arrangement of rectifier diodes on the one or more AC wire conductors;
   applying a power factor correction to achieve DC power;
   outputting a DC power signal having an output voltage at a DC output, the output voltage is measured across one or more capacitors; and
   operating one or more Q1 inrush and shutdown field-effect transistors, the one or more Q1 inrush and shutdown field-effect transistors configured to limit a current flow and to charge the one or more capacitors.

2. The method of claim 1, further comprising powering one or more DC loads with the output voltage.

3. The method of claim 1, further comprising providing an AC-rated device for AC protection on the one or more AC wire conductors.

4. The method of claim 1, wherein the DC output comprises a positive DC output and a DC output ground, and wherein the AC power at the secondary side of the three-phase distribution transformer is in non-isolated communication with the DC output ground through a neutral wire conductor.

5. The method of claim 4, wherein the AC power at the secondary side of the three-phase distribution transformer is grounded through a connection from the neutral wire conductor to a safety ground, wherein the DC output ground is grounded through the connection from the neutral wire conductor to the safety ground, and wherein the safety ground is a solid, low-, or high-impedance grounding.

6. A method for converting alternating current (AC) power to direct current (DC) power in a non-isolated power converter, the method comprising:
   receiving a three-phase power supply, the three-phase power supply having an AC current that is a full-wave sinusoidal AC current;
   transforming the three phase power supply into six voltage phases at a secondary side of a three-phase distribution transformer, the three-phase distribution transformer comprising a center tap on the secondary side and one or more AC wire conductors carrying the transformed power supply;
   half-wave rectifying the AC current at the secondary side of the three phase distribution transformer, the half wave rectification accomplished by an arrangement of rectifier diodes on the one or more AC wire conductors;
   applying a power factor correction to achieve DC power;
   outputting a DC power signal having an output voltage at a DC output; and
   operating one or more Q2 ORing field-effect transistors, the one or more Q2 ORing field-effect transistors configured to turn off for fault isolation upon sensing a negative current flow from the DC output.

7. A non-isolated, three-phase rectifier comprising:
   an input arranged to accept a six-phase AC voltage input, the six-phase AC voltage input having a half-wave rectified current;
   a single-stage power factor correction without galvanized isolation in communication with the input;
   output conductors in communication with the single-stage power factor correction without galvanized isolation, the output conductors comprising a first output conductor configured to connect a DC ground to a distribution transformer neutral and a second output conductor configured to deliver a positive DC voltage to a single DC bus; and
   an ORing field-effect transistor connected to the second output conductor, the ORing field-effect transistor configured to isolate the rectifier when a fault occurs.

8. A power converter for converting alternating current (AC) power to direct current (DC) power, the power converter comprising:
   a three-phase distribution transformer for three-phase alternating current having a primary side and a secondary side with a center tap at the secondary side of the three-phase distribution transformer forming a transformer neutral, the three-phase alternating current having three incoming AC phases;

a non-isolating three-phase rectifier in communication with the three-phase distribution transformer and having a positive DC output and a DC output ground, wherein the non-isolating three-phase rectifier comprises a rectifier diode on each incoming AC phase and at least one boost converter corresponding to each of the incoming AC phases;

a bulk electrolytic capacitor residing connected between the positive DC output and the DC output ground; and a direct connection between the DC output ground and the transformer neutral.

9. The power converter of claim 8, wherein the center tap at the secondary side provides a six-phase AC voltage, wherein the AC current at the primary side is a full-wave sinusoidal AC current, and wherein the AC currents at the secondary side are half-wave rectified.

10. The power converter of claim 8, wherein the direct connection between the DC output ground and the transformer neutral is safety grounded at a solid, low-, or high-impedance grounding.

11. A non-isolated, three-phase rectifier comprising:

an input arranged to accept a six-phase AC voltage input, the six-phase AC voltage input having a half-wave rectified current;

a single-stage power factor correction without galvanized isolation in communication with the input;

output conductors in communication with the single-stage power factor correction without galvanized isolation, the output conductors comprising a first output conductor configured to connect a DC ground to a distribution transformer neutral and a second output conductor configured to deliver a positive DC voltage to a single DC bus;

an AC inrush and shutdown field-effect transistor connected to the second output conductor; and a bulk electrolytic capacitor connected to the first and second output conductors, wherein the AC inrush and shutdown field-effect transistor is configured to limit the current and charge the bulk electrolytic capacitor.

12. A power conversion system comprising:

a plurality of non-isolated, three-phase rectifiers configured to operate in parallel, wherein at least one of the plurality of non-isolated, three-phase rectifiers comprises:

an input arranged to accept a six-phase AC voltage input, the six-phase AC voltage input having a half-wave rectified current;

a single-stage power factor correction without galvanized isolation in communication with the input;

output conductors in communication with the single-stage power factor correction without galvanized isolation, the output conductors comprising a first output conductor configured to connect a DC ground to a distribution transformer neutral and a second output conductor configured to deliver a positive DC voltage to a single DC bus; and an ORing field-effect transistor connected to the second output conductor, the ORing field-effect transistor configured to isolate the rectifier when a fault occurs; and at least one distribution transformer having a primary winding accepting three-phase AC power and a secondary winding with a center tap that forms a transformer neutral, wherein the first output from the rectifier is directly connected to the distribution transformer neutral without isolation.

13. The power conversion system of claim 12, further comprising a rectifier diode configured to half-wave rectify the three-phase AC power at the secondary winding of the distribution transformer, wherein the center tap at the secondary winding provides a six-phase voltage.

14. The power conversion system of claim 13, wherein the six-phase voltage feeds at least one of the plurality of non-isolated, three-phase rectifiers.

15. The power conversion system of claim 13, wherein the six-phase voltage feeds more than one of the plurality of non-isolated, three-phase rectifiers.

* * * * *